W. ATWOOD.
Ore and Paint Separator.
No. 79,802.
Patented July 14, 1868.
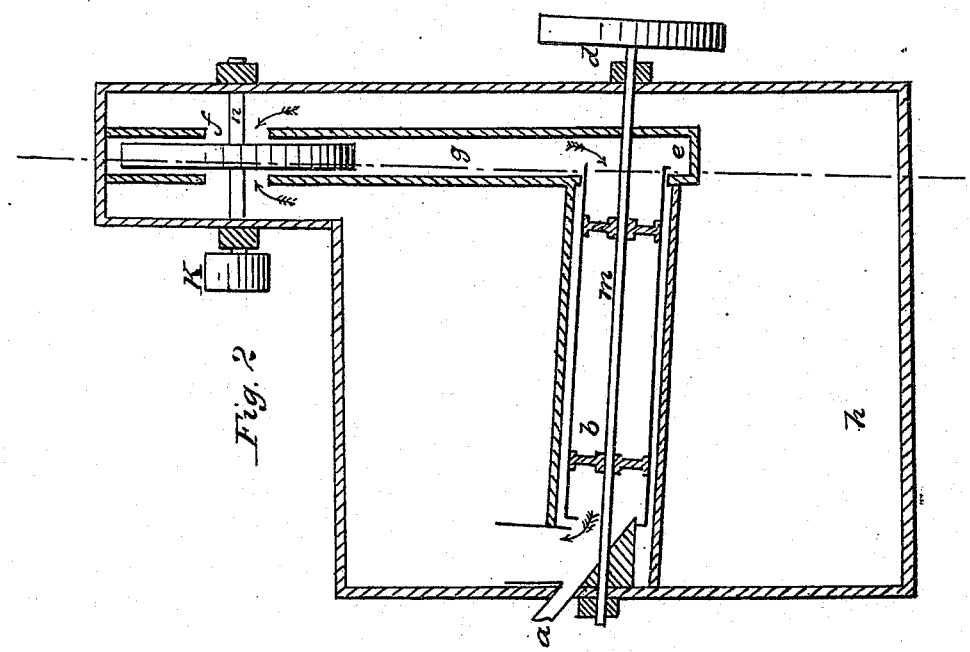
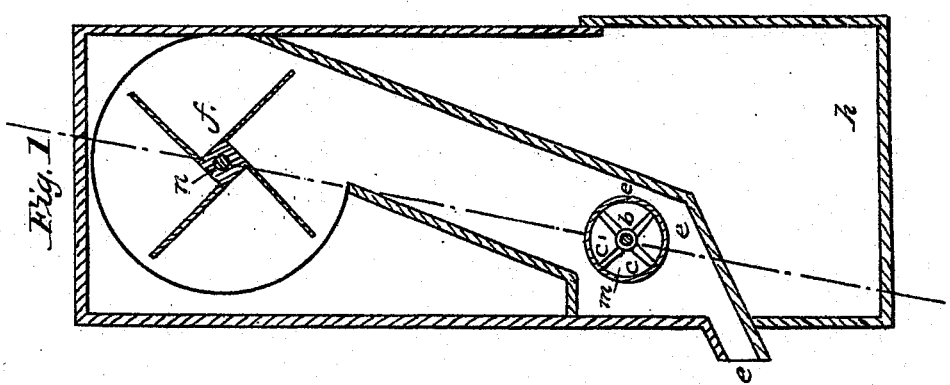
Witnesses:
Henry C. Houston
Wm Frank Seavey
Inventor:
Wm Atwood
by W. C. Ford
Atty

United States Patent Office.

WILLIAM ATWOOD, OF CAPE ELIZABETH, MAINE.

Letters Patent No. 79,802, dated July 14, 1868.

---

IMPROVED MACHINE FOR SEPARATING LIGHT FROM HEAVY PARTICLES OF LITHARGE, PAINT, &c.

---

The Schedule referred to in these Letters Patent and making part of the same.

---

TO ALL WHOM IT MAY CONCERN:

Be it known that I, WILLIAM ATWOOD, of Cape Elizabeth, in the county of Cumberland, and State of Maine, have invented a new and useful Method of Separating the Fine from the Coarse Particles of Litharge and other substances; and I hereby declare the following to be a full, clear, and exact description thereof, which will enable others to make and use my invention, reference being had to the accompanying drawings, forming part of this specification, in which—

Figure 1 shows an end sectional elevation.

Figure 2, a side sectional elevation.

Red lines denote the plane of the section.

Same letters show like parts.

The operation of removing the impurities and coarser particles of litharge, and like substances, is at present performed by exposing them to the action of a swift current of water.

By this method the finer and purer portions are held in suspension in the water, while the coarser particles quickly sink to the bottom.

The water, carrying with it the fine particles, is then allowed to pass into a receptacle and settle, and then drained off, leaving the substance purified in a wet state, and it is necessary to dry it before it is ready for the market.

The object of my invention is to obtain a method of refining and purifying such articles, which will leave them in a merchantable state, without the after process of drying. This I do, by substituting for the current of water a blast of air, which may carry with it the lighter particles, and deposit them, allowing the heavier parts to be drawn off in another direction. This serves to economize both time and labor, and does not require water-power.

A reference to the drawings will show the parts of my device.

$a$, fig. 2, is a spout, through which the raw material is put into the machine. It there passes into the hollow cylindrical drum $b$, set on the shaft $m$, and which is provided with flanges $c\ c\ c\ c$, (see fig. 1,) and is revolved by a band-wheel, $d$, at the extremity of the shaft $m$, which revolution generates centrifugal force in the substance contained in the cylinder. This hollow drum is somewhat inclined, and at its lower end is placed a second spout, through which the heavy portions of the litharge, paint, &c., fall into any convenient receptacle. The lighter parts are separated from them by the motion of the drum, and are thrown toward its centre. Passing through the centre is a powerful current of air, put in motion by the fan-wheel $f$ on the shaft $n$, and driven by the band-wheel $k$. This blast or current follows the direction of the arrows down the tube $g$, through the drum $b$, carrying with it the litharge or paint to the upper end of said drum, and over into the chamber $h$, when the fine particles are allowed to subside. When the chamber is filled these particles may be removed in a clean and dry condition, ready for transportation and use.

By the centrifugal force, generated by the motion of the drum, the heavier portions of the litharge are driven to the sides, and are, moreover, disturbed and stirred by the flanges $c$, these heavier portions being outermost and the lighter nearer the centre of the drum, and perhaps floating in the air.

The strong air-blast takes up a certain proportion of these finer particles, and carries them with it, as described. The quantity taken up may be regulated with great nicety, by increasing or diminishing the force of the current of air from the fan-wheel, by making it revolve faster or slower, as the case may be. It is obvious that, instead of the rotary motion of the drum, a receptacle could be employed having an oscillating motion.

What I claim as my invention, and desire to secure by Letters Patent, is—

1. The combination of the fan-wheel $f$, tube $g$, and rotating-drum $b$, as and for the specified purposes.

2. The combination of the spout $a$ with the rotating-drum $b$, as and for the purposes set forth.

3. In combination with the fan-wheel $f$, tube $g$, and drum $b$, all operating as described, the deposit-chamber $h$, for the purposes described.

4. Separating the finer from the coarser particles of litharge, &c., by means of a current of air forced through a rotating-drum, &c., and carrying the said finer particles into a deposit-chamber, substantially as described.

WM. ATWOOD.

Witnesses:
W. H. CLIFFORD,
WM. FRANK SEAVEY.